United States Patent [19]

Phillips et al.

[11] 4,179,424

[45] Dec. 18, 1979

[54] METHOD FOR RAPIDLY PRODUCING AMINO METHYLATED POLYMERS AND QUATERNARY AMMONIUM SALTS THEREOF

[75] Inventors: Kenneth G. Phillips, River Forest; Edward G. Ballweber, Glenwood; John R. Hurlock, Hickory Hills, all of Ill.

[73] Assignee: Nalco Chemical Company, Oak Brook, Ill.

[21] Appl. No.: 853,772

[22] Filed: Nov. 21, 1977

[51] Int. Cl.² ............................................ C08L 61/20
[52] U.S. Cl. ............................ 260/29.4 UA; 525/336; 525/359; 525/382; 525/383
[58] Field of Search ...................... 260/29.4 UA, 72 R

[56] References Cited

U.S. PATENT DOCUMENTS

| | | | |
|---|---|---|---|
| 3,323,979 | 6/1957 | Foster et al. | 162/167 |
| 3,539,535 | 11/1970 | Wister | 260/72 |
| 3,719,748 | 3/1973 | Manfroy et al. | 423/544 |
| 3,790,529 | 2/1974 | Fijimera et al. | 260/72 R |
| 3,830,655 | 8/1974 | Ruthwell | 260/89.7 R |
| 3,859,212 | 1/1975 | Smalley et al. | 210/54 |
| 3,864,312 | 2/1975 | Suzuke | 260/67.5 |
| 3,897,333 | 7/1975 | Field et al. | 210/10 |
| 3,907,758 | 9/1975 | Szckmann et al. | 260/79.3 MU |
| 3,988,277 | 10/1976 | Witschonke et al. | 260/29.6 AT |
| 4,021,394 | 5/1977 | Tuku et al. | 260/29.4 UA |
| 4,022,741 | 5/1977 | Tuku et al. | 260/29.4 UA |
| 4,049,606 | 9/1977 | Hunter et al. | 260/29.4 UA |

OTHER PUBLICATIONS

"College Chemistry", 3rd edition, Sisler et al., The MacMilton Co., N.Y., pp. 287-289.

*Primary Examiner*—J. Ziegler
*Attorney, Agent, or Firm*—John G. Premo; Robert A. Miller

[57] ABSTRACT

An improved process for rapidly preparing amino methylated derivatives of dilute aqueous solutions of acrylamide polymers which comprises the steps:

A. Preparing a 2.8-6% aqueous solution of an acrylamide polymer which has a molecular weight of at least 500,000;

B. Adding to the solution formed in A approximately 1 mole of formaldehyde and approximately 1 mole of a dialkyl amine which contains from 2-4 carbon atoms based on the amide content of the acrylamide polymer under conditions of good agitation;

C. Reacting the acrylamide polymer with the formaldehyde and the dialkyl amine at a temperature between 80-100° C. for a period of time ranging between 2-15 minutes to form an amino methylated acrylamide polymer.

$C_1$-$C_4$ alkyl quaternary ammonium salt derivatives of these amino methylated acrylamide polymers may be prepared by adjusting the pH to 8.4-8.7 and reacting them with a lower alkyl quaternizing agent at a temperature ranging between 50°-80° C. for a period of time ranging between 2-5 minutes.

5 Claims, 8 Drawing Figures

MANNICH REACTION IN DILUTE AQUEOUS POLYACRYLAMIDE SOLUTIONS
AS A FUNCTION OF TIME TEMPERATURE AND CONCENTRATION

QUATERNIZATION OF MANNICH AMINE WITH DIMETHYL SULFATE AS A FUNCTION OF TIME TEMPERATURE AND PH

QUATERNIZATION OF MANNICH AMINE WITH METHYL BROMIDE @ 80° C
AS A FUNCTION OF TIME AND PH ADJUSTMENT WITH ACETIC ACID
2.6 % OR 5.2 % SOLUTIONS

| DATA POINTS | MANNICH CONC'N. | ACETIC ACID | PREMIX TIME | INITIAL PH | FINAL PH |
|---|---|---|---|---|---|
| ⊙ | 2.6 % | NONE | NONE | 10.7 | 7.4 |
| ▫ | 5.2 % | 0.53 | NONE | 2.4 | 3.7 |
| △ | 2.6 % | 0.53 | 10 MIN. | 8.4 | 4.9 |
| ⬡ | 2.6 % | 0.72 | 10 MIN. | 7.8 | 4.6 |
| ▽ | 2.6 % | 0.53 | NONE | 8.4 | 4.8 |

METHOD FOR RAPIDLY PRODUCING AMINO METHYLATED POLYMERS AND QUATERNARY AMMONIUM SALTS THEREOF

INTRODUCTION

It is now well known that acrylamide polymers, particularly homopolymers of acrylamide, may be modified by reaction with formaldehyde and amines, particularly lower dialkyl amines, to product amino methylated polymers. This is a form of the well-known Mannich reaction. It is also known that the amino methylated polymers may be further reacted with quaternizing agents to produce the quaternary ammonium salt derivatives thereof.

Early workers in the field worked with acrylamide polymers such as polyacrylamide and polymethacrylamide, and reacted dilute solutions thereof with formaldehyde and amines such as dimethylamine to produce amino methylated polymers. Typical of such early work is the work of Grimm, U.S. Pat. No. 2,328,901, and the work of Suen-Schiller which is set forth in *Industrial and Engineering Chemistry*, Vol. 48, pages 2132 thru 2137. These early workers used reaction times ranging from as little as 1 hour up to several hours. Also, they would frequently adjust the pH of the polymer solution into the acid range. While the polymers produced by these early workers were satisfactory, the reaction times and conditions given were not conductive for present day applications to which these polymers are employed. This is particularly true when the amine methylated acrylamide polymers are used to treat large scale aqueous systems such as paper mills and the like.

While the prior art methods for preparing amino methylated polymers can be readily conducted in chemical plants, it is not feasible to economically ship the end products, e.g. dilute solutions, for long distances since the freight costs for the water present is prohibitive. For many large scale industrial applications of the amino methylated polymers, it is necessary that these polymers be prepared at the location where they are to be used. Since many of these locations are not equipped to conduct sophisticated chemical reactions nor do they have storage vessels for containing large quantities of chemical products, the prior art methods are not suited for job site preparation of amino methylated polymers.

The invention is directed to techniques whereby amino methylated acrylamide polymers may be prepared very rapidly using a mininum amount of equipment and the end product would be immediately used to treat industrial aqueous systems such as paper mills, sewage plants, and the like.

In accordance with the invention, it has been found that amino methylated acrylamide polymers may be rapidly prepared as dilute aqueous solutions by using the following sequence of steps:

A. Preparing a 2.8–6% aqueous solution of an acrylamide polymer which has a molecular weight of at least 500,000;

B. Adding to the solution formed in A approximately 1 mole of formaldehyde and approximately 1 mole of a dialkyl amine which contains from 2–4 carbon atoms based on the amide content of the acrylamide polymer under conditions of good agitation;

C. Reacting the acrylamide polymer with the formaldehyde and the dialkyl amine at a temperature between 80°–100° C. for a period of time ranging between 2–15 minutes to form an amino methylated acrylamide polymer.

The Acrylamide Polymers

The acrylamide polymers used in the practice of the invention may be either polymers of acrylamide or methacrylamide. They are preferably acrylamide polymers. Also included are copolymers of acrylamide or methacrylamide which contain up to 20% of other monomeric units within the polymer chain. Thus, acrylic acid, styrene sulphonic acid, acrylonitrile, vinyl acetate, and the like may be copolymerized with acrylamide. It is to be understood, however, that the preferred polymeric species are the homopolymers of acrylamide.

In most industrial applications, it is beneficial that the acrylamide polymers have a molecular weight of at least 500,000 and, in most instances, molecular weights of 1,000,000 or more provide the most useful starting polymers for use in the practice of this invention.

The acrylamide polymers are first prepared as a dilute aqueous solution whih contains between 2.8–6% by weight of the polymers. In the case of polymers having a molecular weight of about 2–3,000,000, it is preferred that the polymer concentration in the solution be within the range of 3–5% by weight.

These dilute acrylamide solutions may be prepared by dissolving dry acrylamide polymers into water. Preferably, however, they are prepared by inverting water-in-oil emulsions of the acrylamide polymers into water in the presence of an inverting agent, which technique allows dilute solutions of these polymers to be prepared in but a few minutes. This method of inverting water-in-oil emulsions of acrylamide polymers in the presence of an inverting agent is described in detail in U.S. Pat. No. 3,624,019, the disclosure of which is incorporated herein by reference.

The Formaldehyde Solutions

The formaldehyde solutions useful in our invention for the preparation of the water-soluble amino methylated modified acrylamide polymer generally contain from 10–50% formaldehyde and, preferably, from 20–40% formaldehyde. These solutions are commercially available and need not be elaborated on. Additionally, it is within the scope of our invention to dissolve paraformaldehyde in water to produce a formaldehyde solution suitable for use in our invention.

The Secondary Amines

The preferred secondary amine used to prepare the amino methylated modified water-soluble acrylamide polymer within the scope of our invention is dimethylamine. However, other secondary amines such as N, N-methyl ethyl amine and diethylamine which are water soluble and which are generally characterized as lower alkyl secondary amines may be employed. Typically, these secondary amines will contain from 2–4 carbon atoms. With the preferred secondary amine of our invention dimethylamine, aqueous solutions are generally available commercially ranging from 15–60% by weight. It is often expedient within the course of our invention to use as concentrated an aqueous solution as feasible due to the fact that less storage facilities are necessary.

Conditions of the Reaction

The amount of formaldehyde and amine which is added to the acrylamide polymer solutions should be an amount sufficient to provide approximately 1 mole of formaldehyde and approximately 1 mole of the amine per mole of amido nitrogen present in the polymer. The reaction can be sensitive to excesses of formaldehyde so, therefore, the 1 molar quantity prescribed should be adhered to. Formaldehyde excesses seem to cause undesirable cross linking with a resultant insolubility of the finished polymer. The amine reactant may be employed in quantities slightly in excess of 1 mole, e.g. 1.1–1.2 moles, although it is not necessary. While slight excesses tend to stabilize the formation of the amino methylated product, the excess has the disadvantage of forming undesirable amino biproducts which do not enter into reaction with the acrylamide polymers.

The reaction between the amine, formaldehyde and the acrylamide polymer should be conducted under conditions of good agitation whereby good mixing is achieved. Violet agitation is to be avoided, however, since it is possible to shear the polymer which causes a decrease in its molecular weight.

Time and Temperature

The most important feature of the invention is that substantial reaction of the formaldehyde and the amine with the acrylamide polymers can be achieved by utilizing reaction times ranging from as little as 2 minutes up to about 15 minutes. The time of the reaction is inversely proportional to the temperatures. These temperatures may range from 80° up to 100° C. One of the interesting factors discovered in the practice of the invention is that once the above solutions are prepared, they should not be held longer than 30 minutes when the reaction temperature is 80° C., nor more than 10 minutes when the reaction temperature is 100° C., since the polymers produced tend to increased in viscosity and eventually form gel-like materials which render them unsuitable for many applications.

Due to the short reaction times required to prepare the amino methylated polymers, it is possible to conduct the reactions described above in so-called continuous-type chemical equipment such as a tubular reactor which means that the finished materials can be produced continuously and added to an application site without requiring any storage of finished product. This makes large scale usages of the amino methylated polymers convenient for many users of materials of this type.

An important finding relating to the preparation of the amino methylated polymers is that no pH adjustment of the polymer is required prior to its being reacted with the formaldehyde and the amine.

The Quaternary Ammonium Salt Derivatives

The polymers produced as described above have between 30–80% of the amido groups of the polymer converted to amino functional groups. This renders the polymer weakly cationic in nature. In certain applicational areas, more positively charged polymers are beneficial and to this end it is often beneficial to prepare the quaternary ammonium salt derivative of these polymers to increase the cationic charge of the polymer.

Therefore, another aspect of the invention resides in an improved method for preparing quaternary ammonium salt derivatives of the amino methylated polymers which have been previously prepared in accordance with the methods described above.

It has been found that the amino methylated polymers described above can be conveniently prepared by reacting them with a $C_1$–$C_4$ alkyl quaternizing agent such as $C_1$–$C_4$ alkyl hallide, e.g. chloride or bromide or the corresponding alkyl sulfates.

The preferred quaternizing agents are dimethyl sulfate or methyl bromide. Methyl chloride, ethyl iodide, diethyl sulfate and butyl bromide also may be used.

Before reacting the amino methylated polymer with the quaternizing agent, the polymer should be treated to adjust the pH to within the range of 8.4–8.7. A convenient agent for this neutralization is acetic acid. The quaternization may be conducted at temperatures ranging between 50°–80° C. for a period of time ranging between 2–5 minutes. When the temperature of the quaternization exceeds 50° C., it is beneficial that the pH adjusting material be added with the quaternizing agent since at these temperatures pre-addition of the pH adjusting acid can cause premature gelation. After the reaction has been completed, it is preferable that the temperatures be reduced to below 60° C. if the product is to be stored. In many instances, however, it is contemplated that the quaternary ammonium salt derivatives would be produced continuously and, therefore, no additional cooling would be required since the end product would be used within minutes after it is prepared.

EXPERIMENTS

A. Mannich Reaction:

Reactor: Two experimental reactors were used for the Mannich reaction depending on the temperature to be studied. For reactions conducted at 50° to 80° C., a two liter, jacketed glass resin flask was used. The flask was fitted with a 5-neck head to allow the use of a teflon blade agitator, 2 pressure equalizing glass addition funnels, and a water-coolec condenser. A proportional electronic controller held each reaction at the desired temperature ±2° C. by switching the flow of either cooling water or steam to the jacket. Temperature was recorded via a Tx thermocouple on a recorder.

For some reactions at 80°–100° C., Manniching was conducted in a 1 liter, 316 SS pressure reactor built by Autoclave Engineers. Due to the high viscosities and rapid reactions, no control of the exotherm (i.e. 5° C.) was possible. A glass addition funnel was attached to the port to facilitate introduction of polymer solution and Mannich premix into the evacuated autoclave.

| | Mannich Solutions | |
|---|---|---|
| Procedure: | 2.6% Grams | 5.2% Grams |
| Water, deionized | 758.4 | 660.4 |
| Nonyl phenol $R_x$ 9 moles of ethylene oxide (inverting agent) | 0.4 | 0.8 |
| 28% Polyacrylamide | 43.0 | 86.0 |
| 60% Dimethylamine | 13.3 | 26.7 |
| 37.8% Formaldehyde | 12.5 | 25.0 |

The water, inverting agent, and polymer latex was charged to the reactor and stirred 15 minutes to dissolve, and then heated to the reaction temperature. If the temperature was 80° C. or less, addition of dimethylamine and formaldehyde was made simultaneously from separate funnels over a period of from 1 to 5 minutes. If the temperature was 100° C., dimethylamine and formaldehyde were premixed at <15° C. first and then added to the polymer solution in <15 seconds under nitrogen pressure (autoclave only). Samples were withdrawn at 1 to 5 minute intervals and conversion was determined by colloid titration at pH 4. When equilibrium conversion was reached (i.e. 15 minutes to 2 hours), the reaction was quenched by cooling the product to 30° C. to prevent possible gellation unless the quaternization was to be done immediately after the Mannich reaction.

B. Quaternization

If the quaternization as to be done with dialky sulfate at 30° C., it was carried out in the same resin flask used for the Mannich reaction. Otherwise the freshly prepared Mannich amine was maintained at the intended quaternization temperature and transferred immediately to the one liter autoclave.

|      | Procedure:      |      | Mannich Quats 3.5% Grams | 7.0% Grams |
|------|-----------------|------|--------------------------|------------|
|      | Mannich Solution | 2.6% | 827.5                    |            |
|      | Mannich Solution | 5.2% |                          | 799.0      |
|      | Acetic Acid     | 100% | 5.3                      | 10.6       |
| (or) | Sulfuric Acid   | 96%  | 3.0                      | 6.0        |
|      | Dimethyl Sulfate |      | 21.0                     | 42.0       |
| (or) | Diethyl Sulfate |      | 25.7                     | 51.5       |
| (or) | Methyl Bromide  |      | 16.0                     | 32.0       |
| (or) | Methyl Chloride |      | 8.5                      | 17.0       |

Where indicated, the fresh Mannich amine was neutralized to a pH of 8.5 with either acetic or sulfuric acid. Immediately or within 10 minutes after neutralization, the quatting reagent was added as rapidly as the equipment would allow (i.e. 5 seconds to 1 minute). Transfer to the autoclave was accelerated by forcing the reagent in under nitrogen pressure (i.e. 200 psig). Samples were then withdrawn as frequently as 1 minute apart and conversions were determined by colloid titration at pH 8.5. No attempt was made to control the temperature of rapid reactions <15 minutes due to the high viscosity of the mixture. However, exotherms were usually ≦5° C. After the quaternization, the products were cooled immediately to prevent gellation. Brookfield viscosities and pH's were measured at 25° C.

RESULTS AND DISCUSSION

A. Mannich Reaction

Figure 1:
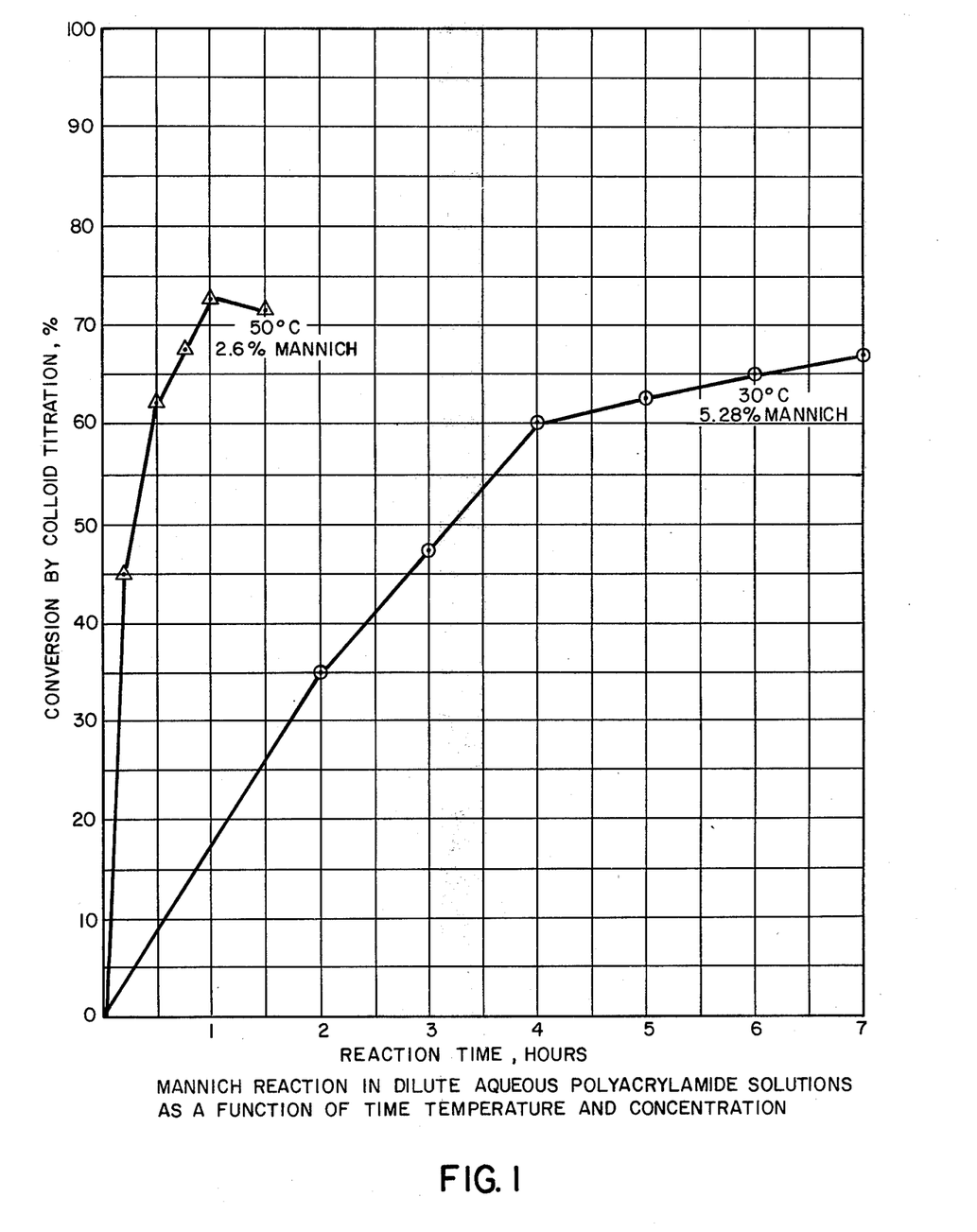

FIG. 1 illustrates the rate of the Mannich reaction at 30° C. and at 50° C. in dilute solutions of inverted latex.

| Polyacrylamide | 1.00 Equiv. |
|----------------|-------------|
| Formaldehyde   | 0.94 mole   |
| Dimethylamine  | 1.06 mole   |

Figure 2:
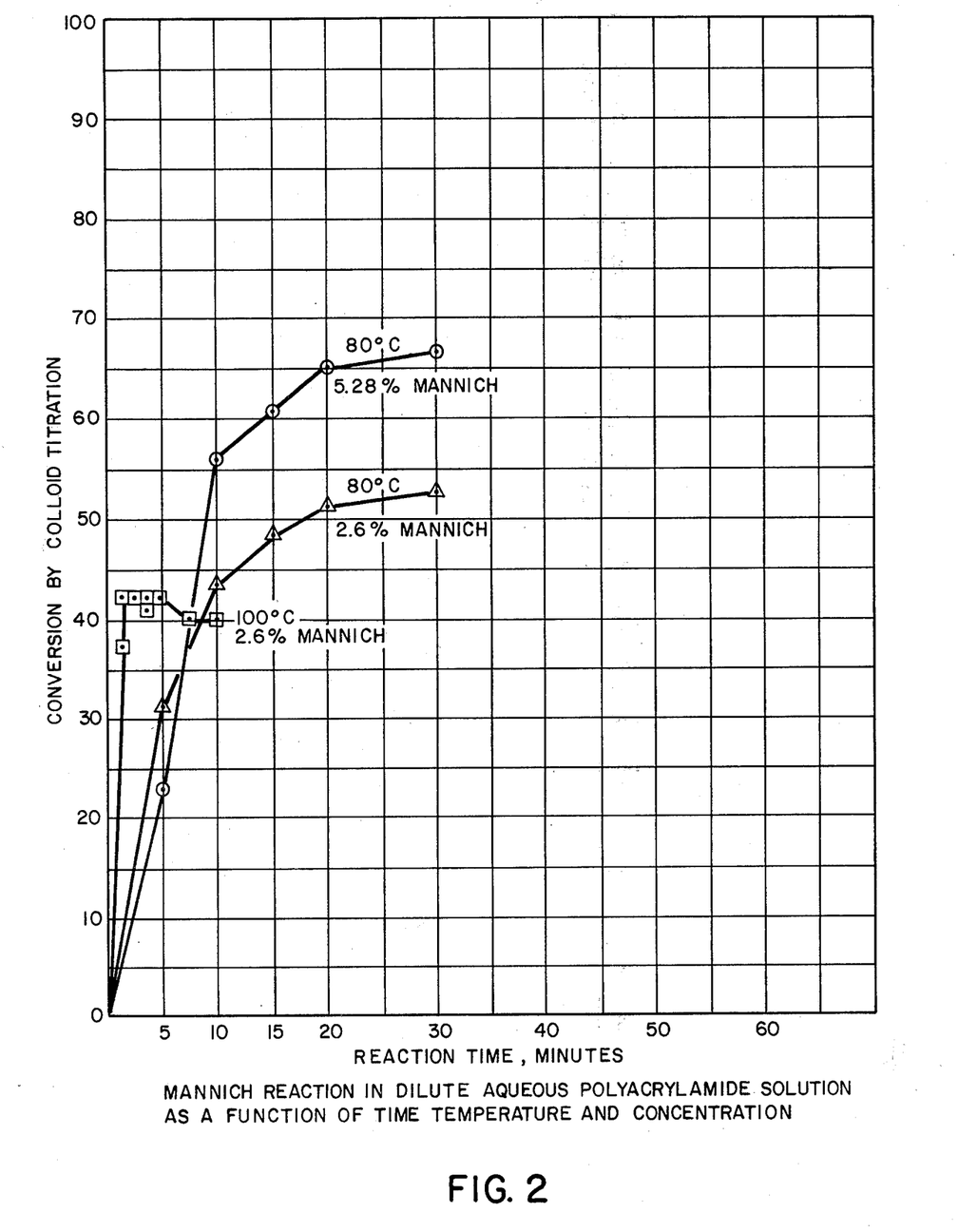

FIG. 2 shows the rate of the Mannich reaction at 80° C. and at 100° C. The ultimate or equilibrium yield of Mannich derivative is significantly reduced for reaction temperatures above 50° C. and/or where the reaction mixture is less than 5.28% solids.

| Temperature | Concentration | Yield |
|-------------|---------------|-------|
| 30° C.      | 5.28%         | 66%   |
| 50° C.      | 2.6%          | 72%   |
| 80° C.      | 5.28%         | 66%   |
| 80° C.      | 2.6%          | 52%   |
| 100° C.     | 2.6%          | 40%   |

Because of the strong dependence of the yield of the Mannich reaction upon concentration, the Mannich amines used in all subsequent quaternization experiments were prepared as 5.28% solutions and then diluted, if necessary, to 2.6% solutions to facilitate handling of viscous reaction mixtures in the autoclave. See Table I.

TABLE I

| Test No. | Polyacrylamide Backbone Aqueous Soln. % | Mannich Reactions Time Min. | Mannich Reactions Temp °C. | Mannich Amine Products Active Conc. % | Mannich Amine Products Intrinsic dl/gm | Mannich Amine Products Huggins | Mannich Amine Products Charge Equiv. B.O.P. | Adjustment of pH Acids Used Type | Adjustment of pH Acids Used Equiv. B.O.P. | Adjustment of pH pH | Quatting Reaction Condition Reagent Type | Quatting Reaction Condition Equiv. % B.O.P.[3] | Quatting Reaction Condition Temp °C | Quatting Reaction Condition Time Allowed | Quatting Reaction Condition Time to 90% Conver. | Mannich Quat Products Active Conc. % | Mannich Quat Products Viscosity at 25° C. cps | Mannich Quat Products Intrinsic dl/gm | Mannich Quat Products Huggins | Mannich Quat Products Equiv. B.O.P. |
|---|---|---|---|---|---|---|---|---|---|---|---|---|---|---|---|---|---|---|---|---|
| 1 | 3.00[1] | 30 | 80 | 5.28 | 5.57 | .90 | 66% | None | — | 9.4 | $(CH_3)_2SO_4$ | 100 | 30 | 1 Hour | 10 Min. | 7.0 | 31,000 | 4.87 | .59 | 64% |
| 2 | 1.47[2] | 40 | 80 | 5.28 | 9.82 | .57 | 52% | None | — | — | $(CH_3)_2SO_4$ | 100 | 300 | 1 Hour | — | 3.5 | >400,000 | 5.34 | 1.1 | 50% |
| 3 | 3.00 | 30 | 80 | 5.28 | — | — | 64% | None | — | — | $(C_2H_5)_2SO_4$ | 100 | 30 | 6 Hour | 3 Hour | 3.5 | >400,000 | 5.65 | .52 | 59% |
| 4 | 1.47 | 40 | 80 | 2.57 | 6.81 | .61 | 71% | None | — | 10.7 | $CH_3Cl$ | 200 | 30 | 19 Hour | 7 Hour | 3.5 | 7,000 | 5.38 | .52 | 61% |
| 5 | 1.47 | 30 | 80 | 2.57 | 6.82 | .54 | 65% | None | — | 10.4 | $CH_3Cl$ | 100 | 50 | 4 Hour | 2 Hour | 3.5 | 16,000 | 4.60 | .62 | 41% |
| 6 | 1.47 | 30 | 80 | 2.57 | 6.62 | .62 | 60% | $H_2SO_4$ | .24 | 9.0 | $CH_3Cl$ | 180 | 50 | 4 Hour | 1¼ Hour | 3.5 | 9,000 | 4.58 | .77 | 46% |
| 7 | 1.47 | 30 | 80 | 2.57 | 6.49 | .63 | 60% | $H_2SO_4$ | .36 | 8.6 | $CH_3Cl$ | 180 | 50 | 5 Hour | 3 Hour | 3.5 | 5,000 | 5.66 | .53 | 50% |
| 8 | 1.47 | 20 | 80 | 2.57 | 6.31 | .68 | 62% | $H_2SO_4$ | .36 | 8.8 | $CH_3Cl$ | 100 | 50 | 4 Hour | 2 Hour | | 15,500 | 4.74 | .75 | 47% |
| 9 | 1.47 | 25 | 80 | 2.57 | — | — | — | $H_2SO_4$ | .36 | — | $CH_3Cl$ | 180 | 80 | 90 Min. | 45 Min. | 3.5 | 1,500 | 4.76 | .25 | 19% |
| 10 | 1.47 | 20 | 80 | 2.57 | 6.61 | .54 | 65% | $H_2SO_4$ | .36 | 8.5 | $CH_3Br$ | 180 | 30 | 1 Hour | 20 Min. | 3.5 | — | 4.91 | .64 | 62% |
| 11 | 1.47 | 30 | 80 | 2.57 | 7.02 | .58 | 70% | $H_2SO_4$ | .36 | 8.6 | $CH_3Br$ | 100 | 30 | 2 Hour | 45 Min. | 3.5 | 5,000 | 4.80 | .68 | 59% |
| 12 | 1.47 | 20 | 80 | 2.57 | 6.69 | .56 | 62% | $H_2SO_4$ | .36 | 8.6 | $CH_3Br$ | 180 | 50 | 1 Hour | 5 Min. | 3.5 | 3,900 | 5.10 | .59 | 57% |
| 13 | 1.47 | 30 | 80 | 2.57 | 6.35 | .68 | 60% | $H_2SO_4$ | .36 | 8.7 | $CH_3Br$ | 100 | 50 | 1 Hour | 10 Min. | 3.5 | 3,700 | 4.92 | .54 | 50% |
| 14 | 1.47 | 20 | 80 | 2.57 | 6.61 | .58 | 61% | $H_2SO_4$ | .36 | 8.7 | $CH_3Br$ | 25 | 50 | 3 Hour | 1 Hour | 3.5 | 36,000 | 5.29 | .73 | 46% |
| | | | | | | | | | | | $CH_3Cl$ | 75 | | | | | | | | |
| 15 | 1.47 | 30 | 80 | 2.57 | — | — | 52% | None | — | 10.7 | $CH_3Br$ | 100 | 80 | 30 Min. | — | 3.5 | 400,000 | 3.17 | .96 | None |
| 16 | 1.47 | 20 | 80 | 2.57 | — | — | 41% | $H_2SO_4$ | .36 | 9.0 | $CH_3Br$ | 100 | 80 | 30 Min. | — | 3.5 | 33,000 | 4.62 | .60 | 19% |
| 17 | 1.47 | 20 | 80 | 2.57 | — | — | 45% | $H_2SO_4$ | .53 | 8.7 | $CH_3Br$ | 100 | 80 | 20 Min. | 2 Min. | 3.5 | 3,000 | 4.44 | .57 | 27% |
| 18 | 1.47 | 20 | 80 | 2.57 | — | — | 34% | $H_2SO_4$ | .72 | 8.2 | $CH_3Br$ | 100 | 80 | 30 Min. | 2 Min. | 3.5 | 1,275 | 4.16 | .76 | 20% |
| 19 | 1.47 | 30 | 80 | 2.57 | — | — | 50% | $H_2SO_4$ | .53 | — | $CH_3Br^1$ | 100 | 80 | 20 Min. | 3 Min. | 3.5 | 15,800 | 4.49 | .66 | 21% |
| 20 | 1.47 | 20 | 80 | 2.57 | — | — | 39% | Acetic | .53 | 8.4 | $CH_3Br$ | 100 | 80 | 20 Min. | 3 Min. | 3.5 | 1,900 | 4.41 | .54 | 25% |
| 21 | 1.47 | 20 | 80 | 2.57 | — | — | 28% | Acetic | .72 | 7.8 | $CH_3Br^1$ | 100 | 80 | 20 Min. | 3 Min. | 3.5 | 1,400 | 4.06 | .56 | 20% |
| 22 | 1.47 | 30 | 80 | 2.57 | — | — | 49% | Acetic | .53 | — | $CH_3Br^1$ | 100 | 80 | 20 Min. | 3 Min. | 3.5 | 4,800 | 4.56 | .53 | 36% |
| 23 | 3.00 | 30 | 80 | 5.28 | — | — | 62% | Acetic | .53 | — | $CH_3Br^1$ | 100 | 80 | 20 Min. | 4 Min. | 7.0 | 400,000 | — | — | 52% |

[1] Acid and methyl bromide added simultaneously.
[2] All polyacrylamides had molecular weights of about 2.5 million. The polyacrylamide in this experiment had a molecular weight of about 10-15 million.
[3] Based on polymer.

B. Quaternization

Figure 3:
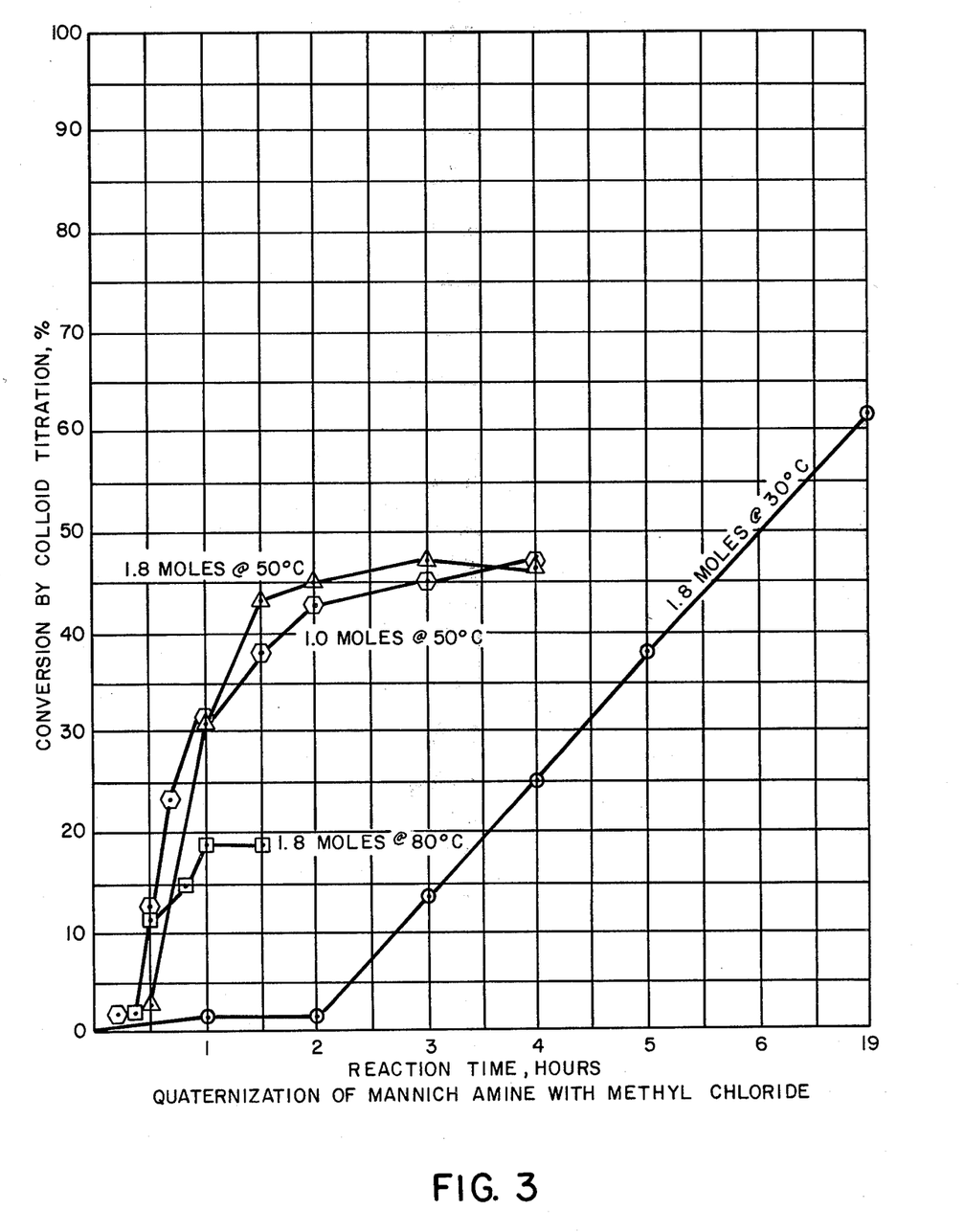

1. Methyl Chloride:

FIG. 3 illustrates the rates of quaternization of 2.6% Mannich amine solutions with methyl chloride at 30° C., 50° C., and 80° C. Each Mannich amine was preneutralized with $H_2SO_4$ (pH 8.5-9) to minimize Hoffman degradation of the quat during the reactions. The data still reveals an increasing loss of Mannich charge as the quatting temperature is increased.

| Reaction Temp. | Time to 90% Completion | Maximum Yield |
|---|---|---|
| 30° C. | 7 hours | 61% |
| 50° C. | 2 hours | 47% |
| 80° C. | 1 hour | 18% |

Apparently thermal degradation of the Mannich amine is increasing faster than is the rate of quaternization by methyl chloride.

Figure 4:
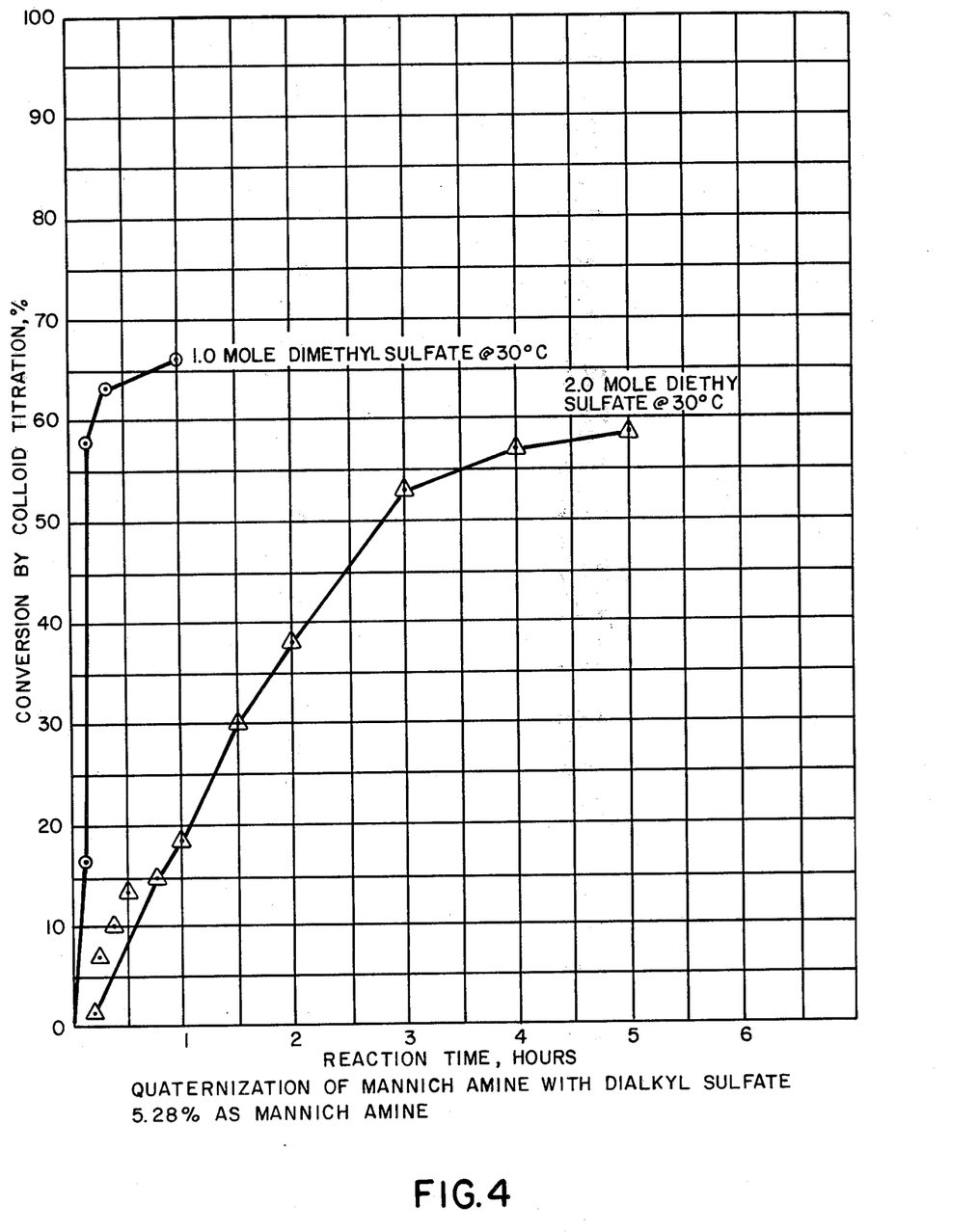
Figure 5:
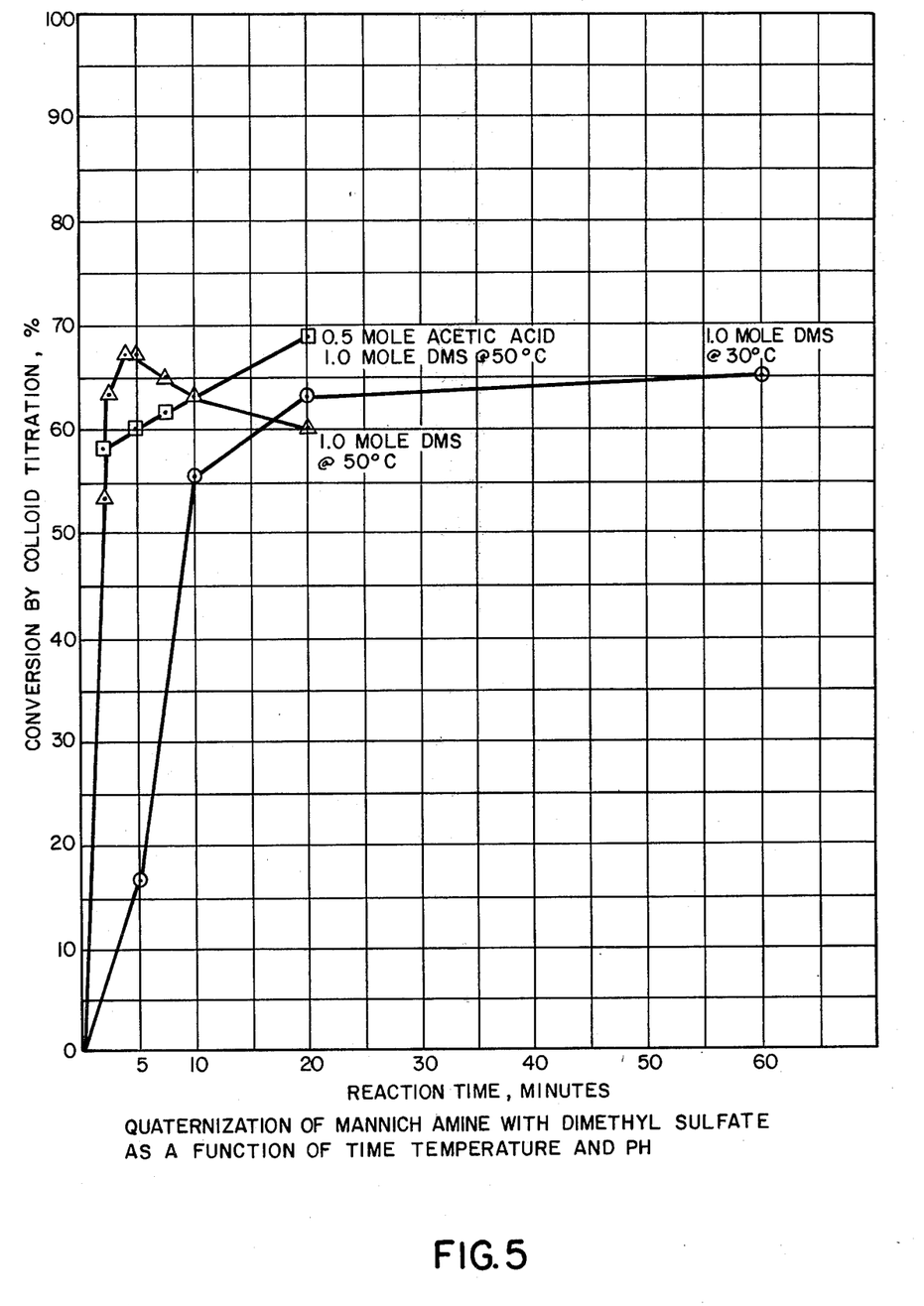

2. Dialkyl Sulfates:

FIG. 4 shows the quaternization of Mannich amine with dimethyl sulfate (DMS) takes only about 20 minutes at 30° C. while quatting with less volatile (less toxic) diethyl sulfate takes about 3 hours at 30° C. FIG. 5 shows that quatting with DMS at 50° C. takes only 2 to 5 minutes but that some acid (i.e. acetic) should be added to prevent Hoffman degradation of the quat at this temperature.

| Reaction Temp. | Acetic Acid | Initial pH | Final pH | Final Yield |
|---|---|---|---|---|
| 30° C. | None | 9.4 | 2.9 | 64% |
| 50° C. | None | 10.5 | 6.7 | 60% |
| 50° C. | 0.5 mole | 8.7 | 3.2 | 69% |

Dimethyl sulfate should be used only with extreme caution because it is very toxic, an experimental carcinogen, and has no odor to warn of its presence in the work area.

Figure 6:
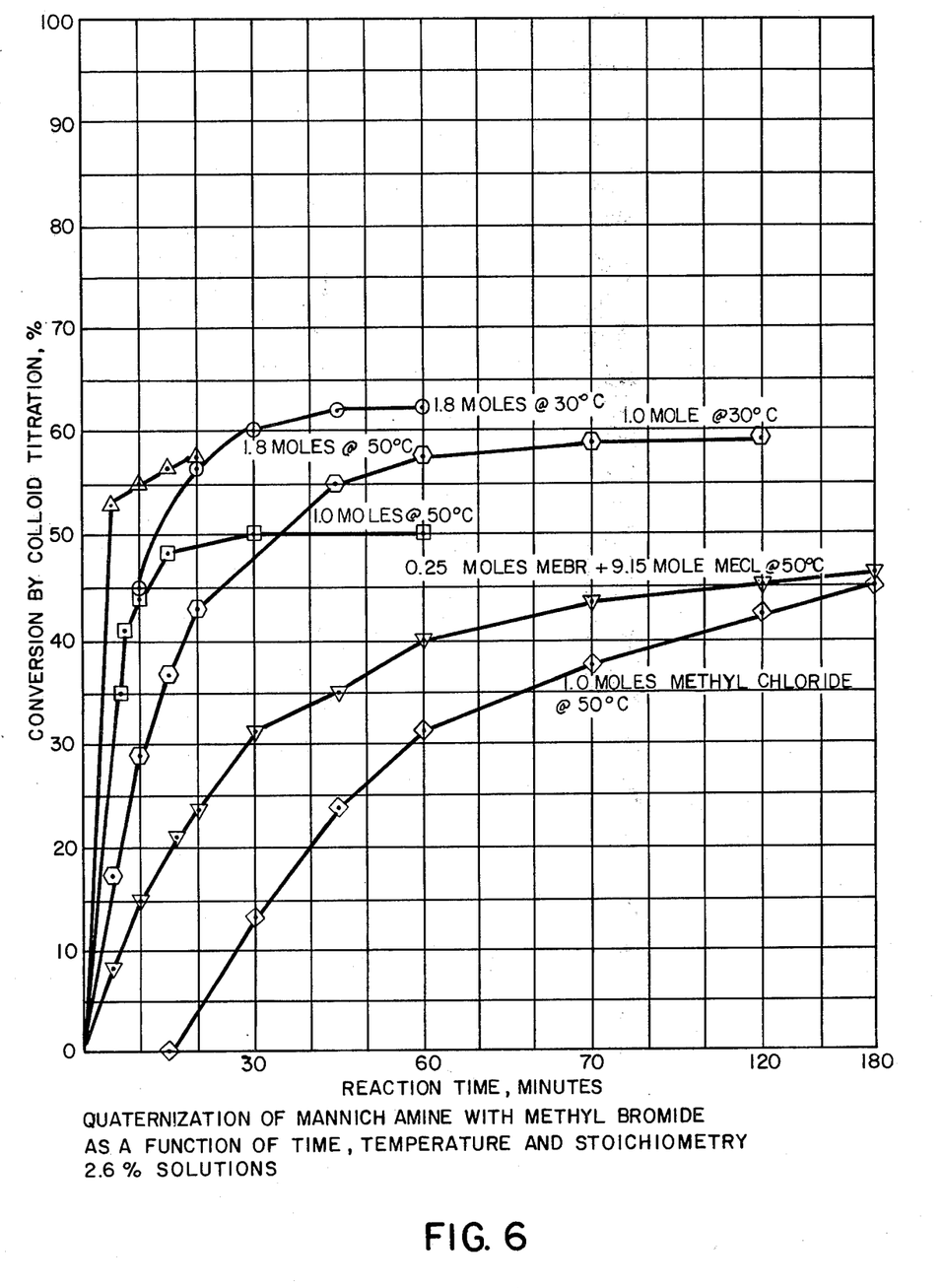

FIG. 6 illustrates that the rate of quaternization of Mannich amine with methyl bromide is more than 10 times as fast as with methyl chloride.

| Reagent(s) Used | Reaction Temp. | Time to 90% Completion | Maximum Quat |
|---|---|---|---|
| 1.0 MeCl | 50° C. | 120 Min. | 47% |
| 0.25 MeBr 0.75 MeCl | 50° C. | 70 Min. | 46% |
| 1.0 MeBr | 50° C. | 10 Min. | 50% |

Addition of a catalytic portion (i.e. 25%) of MeBr had less effect than expected on the rate.

FIG. 6 also reveals that the quatting time required is inversely proportional to the level of MeBr charged and that the rate doubles with a 10° C. rise in temperature.

| Methyl Bromide | Reaction Temp. | Time to 90% Completion | Maximum Quat |
|---|---|---|---|
| 1.0 | 30° C. | 40 | 59% |
| 1.8 | 30° C. | 20 | 62% |
| 1.0 | 50° C. | 10 | 50% |
| 1.8 | 50° C. | 5 | 57% |

Conversion to quat averaged 57% (S.D.=2%) and was 5% higher (P=90%) with excess MeBr but was 7% lower (P=95%) at 50° C. than at 30° C.

Figure 7:
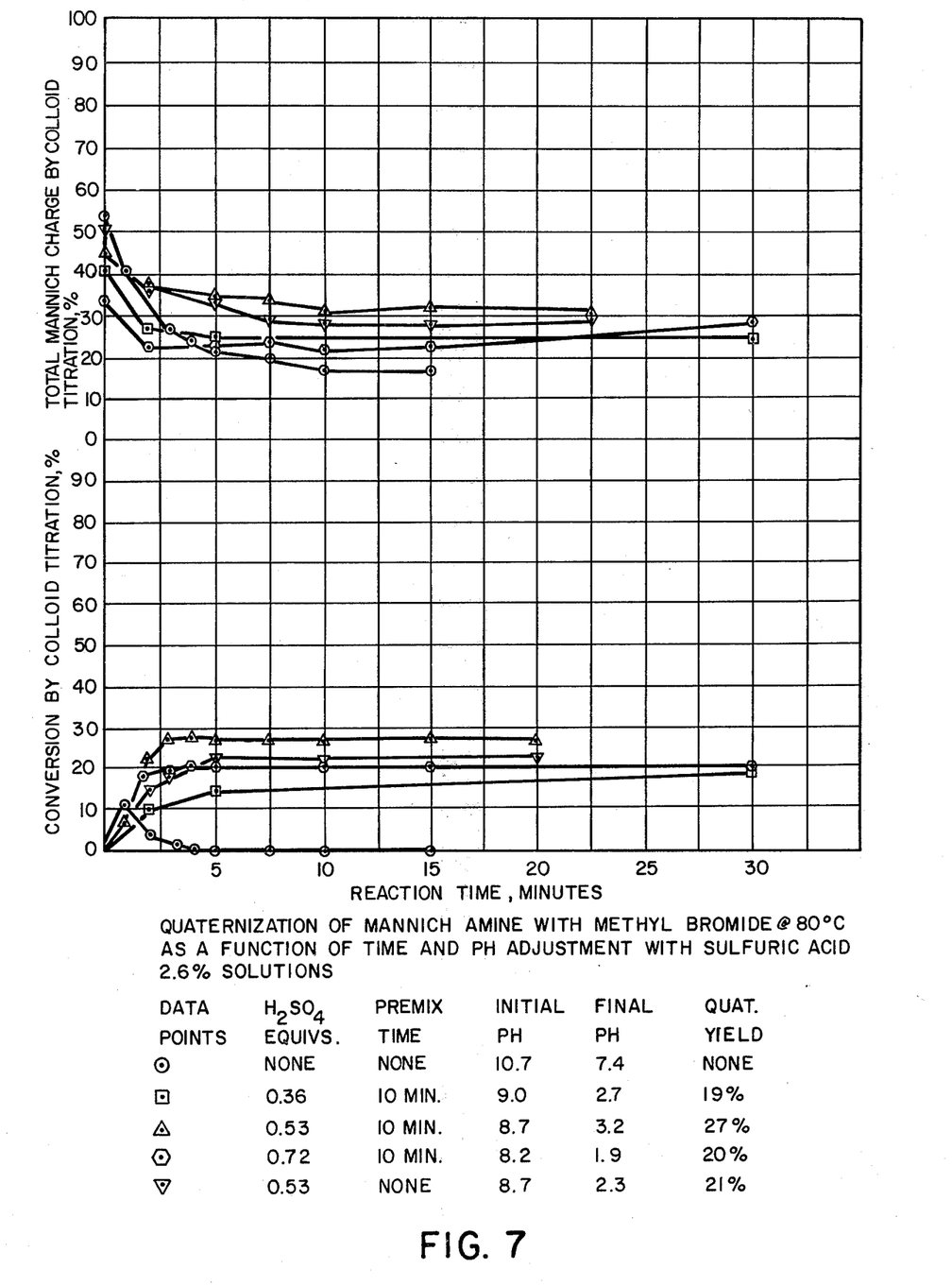

FIG. 7 (lower portion) shows that at a temperature of 80° C., the Mannich quat bromide is so unstable under alkaline conditions (i.e. pH $\geq 7.4$) than its presence is transitory (i.e. 11% after 1 minute) and no quat could be detected at all after only 5 minutes at 80° C.

However, by preneutralizing the Mannich amine with 50 Equiv. % $H_2SO_4$ (based on DMA) the product becomes more acidic (pH 3) and the yield of quat increases to a maximum of 27%.

| Equiv. $H_2SO_4$ | Initial pH | Final pH | Mannich Charge Initial | Mannich Charge Final | Maximum Quat |
|---|---|---|---|---|---|
| None | 10.7 | 7.4 | 25% | 18% | None |
| 0.36 | 9.0 | 2.7 | 41%* | 23% | 19% |
| 0.53 | 8.7 | 3.2 | 45%* | 31% | 27% |
| 0.72 | 8.2 | 1.9 | 34%* | 26% | 20% |
| 0.53 | 8.7 | 2.3 | 50% | 29% | 21% |

The upper portion of FIG. 7 illustrates how much of the total Mannich charge was lost even before the MeBr was added, due to the instability of the Mannich amine salt at pH 8-9. If the $H_2SO_4$ and MeBr are added simultaneously (10 seconds apart), no Mannich charge is lost before quatting but the yield of quat was still low. Several undesirable side reactions may be occurring here due to the non-homogeneity of the reaction mixture. Sulfuric acid is probably too strong an acid to be used in this application.

Figure 8:
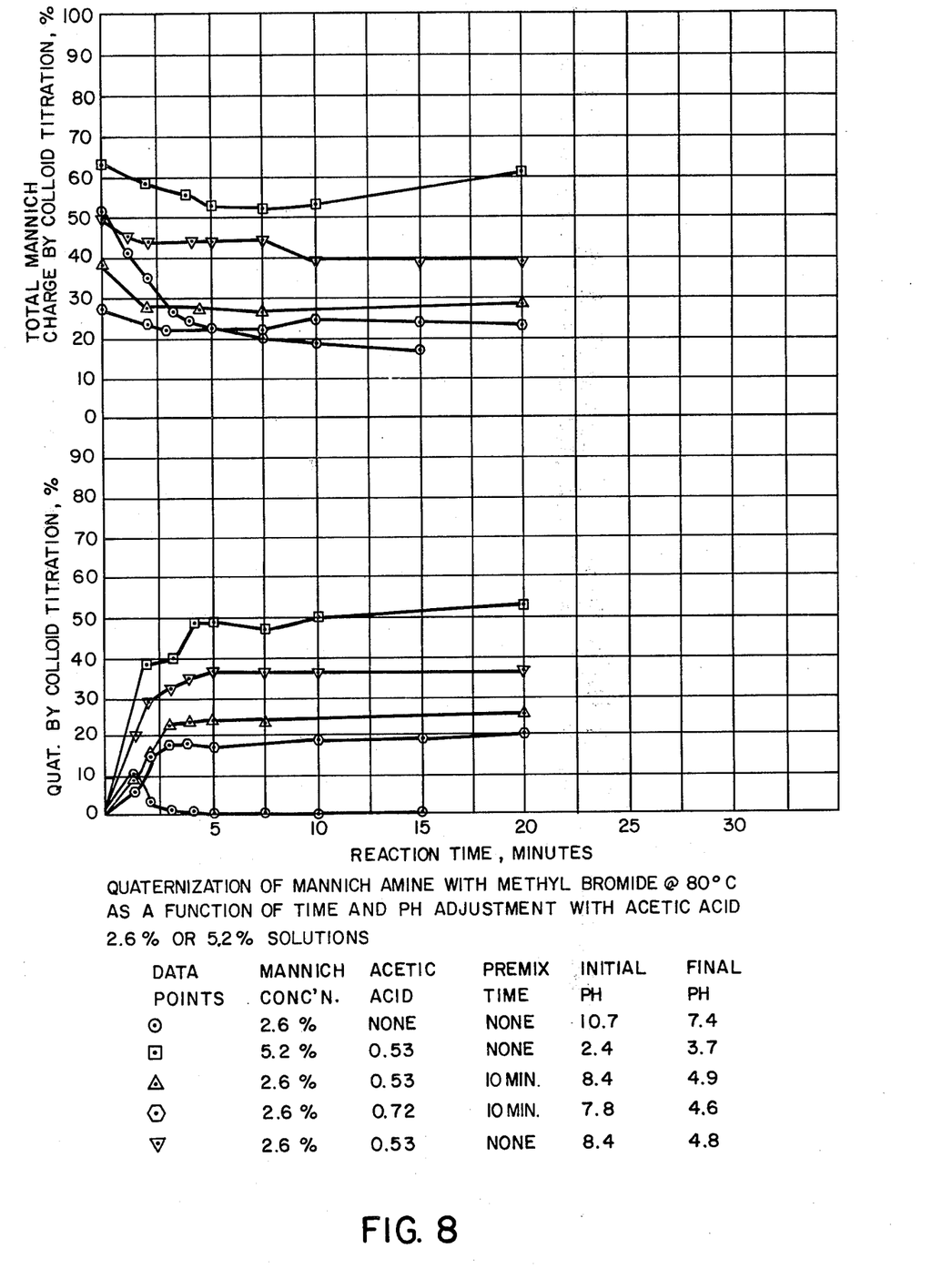

FIG. 8 (lower portion) illustrates that neutralizing the Mannich amine with 50 Equiv. % acetic acid will also optimize the yield of methyl bromide quat at 80° C.

| Equiv. Acetic Acid. | Initial pH | Final pH | Mannich Charge Initial B.O.P. | Mannich Charge Final B.O.P. | Maximum Quat B.O.P. |
|---|---|---|---|---|---|
| 0.53 | 8.4 | 4.9 | 39%* | 29% | 25% |
| 0.72 | 7.8 | 4.6 | 28%* | 22% | 20% |
| 0.53 | 8.4 | 4.8 | 50% | 40% | 36% |

The upper portion of FIG. 8 shows again that much of the Mannich charge was lost during the 10 minute acid blending period (*). Simultaneous addition of acetic acid with MeBr eliminated much of this problem, resulting in significantly higher conversion and better product activity. Further improvement in the Mannich quat bromide (i.e. 52% charge B.O.P.) are possible by doubling the concentration of the reaction mixture to 7% solids. However, this mixture was very difficult to stir in the autoclave (400,000 cps) and some gellation occurred. Therefore the recommended procedure would be to add both a mole of MeBr and 0.53 moles of acetic acid simultaneously to a 5.28% Mannich amine solution and to react for 4 minutes at 80° C.

Having thus described our invention, it is claimed as follows:

1. An improved process for rapidly preparing amino methylated derivatives of dilute aqueous solutions of acrylamide polymers which comprises the steps:

A. Preparing a 2.8–6% aqueous solution of an acrylamide polymer which has a molecular weight of at least 500,000;

B. Adding to the solution formed in A approximately 1 mole of formaldehyde and approximately 1 mole of a dialkyl amine which contains from 2–4 carbon atoms based on the amide content of the acrylamide polymer under conditions of good agitation;

C. Reacting the acrylamide polymer with the formaldehyde and the dialkyl amine at a temperature between 80°–100° C. for a period of time ranging between 2–15 minutes to form an amino methylated acrylamide polymer.

2. The method of claim 1 where the acrylamide polymer is in the form of a 3–5% aqueous solution and its molecular weight is at least 1,000,000; the lower dialkyl amine is dimethylamine and the temperature and time of the reaction is 80° C. for about 15 minutes.

3. The method of claim 2 where the temperature and time of the reaction is conducted at 100° C. for about 2 minutes.

4. A method of preparing a $C_1$–$C_4$ alkyl quaternary ammonium salt derivative of the amino methylated acrylamide polymer prepared in accordance with claim 1 which comprises the steps of adjusting the pH and the lower dialkyl amino methylated acrylamide polymer to between 8.4–8.7 and then reacting the amino methylated acrylamide polymer with about 1 mole of a $C_1$–$C_4$ alkyl quaternizing agent at a temperature ranging between 50°–80° C. for a period of time ranging between 2–5 minutes.

5. The method of claim 4 where the alkyl quaternizing agent is selected from the group consisting of dimethyl sulfate and methyl bromide.

* * * * *